US012560895B2

(12) United States Patent
Kim et al.

(10) Patent No.: US 12,560,895 B2
(45) Date of Patent: Feb. 24, 2026

(54) WEARABLE ELECTRONIC DEVICE COMPRISING AN ANTENNA

(71) Applicant: Samsung Electronics Co., Ltd., Gyeonggi-do (KR)

(72) Inventors: Sewoong Kim, Gyeonggi-do (KR); Woosuk Kang, Gyeonggi-do (KR); Sohyeon Kim, Gyeonggi-do (KR); Jeonghoon Kim, Gyeonggi-do (KR); Jiwon Kim, Gyeonggi-do (KR); Yoseb Oh, Gyeonggi-do (KR); Donguk Choi, Gyeonggi-do (KR); Minhwa Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 472 days.

(21) Appl. No.: 18/082,281

(22) Filed: Dec. 15, 2022

(65) Prior Publication Data

US 2023/0121035 A1 Apr. 20, 2023

Related U.S. Application Data

(63) Continuation of application No. PCT/KR2022/005065, filed on Apr. 7, 2022.

(30) Foreign Application Priority Data

Apr. 7, 2021 (KR) ........................ 10-2021-0045172

(51) Int. Cl.
*G04G 21/04* (2013.01)
*G04G 9/00* (2006.01)
(Continued)

(52) U.S. Cl.
CPC ............. *G04G 21/04* (2013.01); *G04G 9/007* (2013.01); *H01Q 1/273* (2013.01); *H01Q 1/48* (2013.01)

(58) Field of Classification Search
CPC ........ G04G 17/04; G04G 21/04; G04G 9/007; G04R 60/06; H01Q 1/273; H01Q 1/44; H01Q 1/48; H01Q 5/35
See application file for complete search history.

(56) References Cited

U.S. PATENT DOCUMENTS 9,979,426 B2 5/2018 Na et al.
10,020,572 B2 7/2018 Kim et al.
(Continued)

FOREIGN PATENT DOCUMENTS

CN 210897603 U 6/2020
CN 112563749 A 3/2021
(Continued)

OTHER PUBLICATIONS

Extended European Search Report dated May 22, 2024.
Korean Office Action dated May 21, 2025.

*Primary Examiner* — Thien M Le
(74) *Attorney, Agent, or Firm* — Cha & Reiter, LLC.

(57) ABSTRACT

A wearable electronic device according to an embodiment may include a metal frame forming at least a portion of a side surface of the wearable electronic device, a display mounted on the metal frame, a rear cover forming a rear surface of the wearable electronic device, a printed circuit board (PCB) disposed in a space formed by the rear cover and the metal frame, and a wireless communication circuit disposed on the PCB, wherein the wireless communication circuit feeds power to a first point of the metal frame, which having a first height from the rear cover, to receive a signal in a first frequency band, and feeds power to a second point of the metal frame, which has a second height from the rear cover that is higher than the first height to receive a signal in a second frequency band higher than the first frequency band.

20 Claims, 13 Drawing Sheets

(51) Int. Cl.
*H01Q 1/27* (2006.01)
*H01Q 1/48* (2006.01)

(56) References Cited

U.S. PATENT DOCUMENTS

| | | | | |
|---|---|---|---|---|
| 10,027,023 | B1 | 7/2018 | Kim et al. | |
| 10,116,043 | B2 | 10/2018 | Liou et al. | |
| 10,355,344 | B1 | 7/2019 | Ruaro et al. | |
| 10,484,112 | B2 | 11/2019 | Pascolini et al. | |
| 10,608,323 | B2 | 3/2020 | Choi et al. | |
| 10,637,127 | B2 | 4/2020 | Ryu et al. | |
| 10,680,312 | B2 | 6/2020 | Liu et al. | |
| 10,700,421 | B2 | 6/2020 | Coles et al. | |
| 10,944,167 | B2 | 3/2021 | Ahn et al. | |
| 11,095,021 | B2 | 8/2021 | Sung et al. | |
| 11,271,304 | B2 | 3/2022 | Yoo et al. | |
| 2017/0223160 | A1* | 8/2017 | Duddy | H01Q 1/273 |
| 2018/0062249 | A1* | 3/2018 | Sung | H01Q 5/364 |
| 2018/0128924 | A1 | 5/2018 | Wu et al. | |
| 2018/0203421 | A1 | 7/2018 | Zhang et al. | |
| 2019/0131696 | A1 | 5/2019 | Hanshew et al. | |
| 2019/0312340 | A1 | 10/2019 | Li et al. | |
| 2019/0363428 | A1 | 11/2019 | Zhu et al. | |
| 2020/0015701 | A1* | 1/2020 | Wei | A61B 5/332 |
| 2020/0086983 | A1* | 3/2020 | Martin | G06F 3/011 |
| 2020/0288303 | A1* | 9/2020 | Owens | H04W 12/50 |
| 2022/0352621 | A1* | 11/2022 | Zachara | H01Q 9/42 |
| 2023/0121035 | A1* | 4/2023 | Kim | H01Q 5/35<br>368/10 |
| 2023/0208015 | A1* | 6/2023 | Hsu | H01Q 5/357 |
| 2023/0238684 | A1* | 7/2023 | Shin | H01Q 1/273<br>343/702 |
| 2024/0347896 | A1* | 10/2024 | Lu | H01Q 9/42 |

FOREIGN PATENT DOCUMENTS

| | | | |
|---|---|---|---|
| KR | 10-2017-0020138 | A | 2/2017 |
| KR | 10-2017-0089668 | A | 8/2017 |
| KR | 10-2018-0024336 | A | 3/2018 |
| KR | 10-2018-0026861 | A | 3/2018 |
| KR | 10-2019-0016251 | A | 2/2019 |
| KR | 10-2019-0092097 | A | 8/2019 |
| KR | 10-2098099 | B1 | 4/2020 |
| KR | 10-2216758 | B1 | 2/2021 |

* cited by examiner

WEARABLE ELECTRONIC DEVICE COMPRISING AN ANTENNA

CROSS REFERENCE TO RELATED APPLICATION(S)

This application is a continuation of International Application No. PCT/KR2022/005065, filed on Apr. 7, 2022, which claims priority under 35 U.S.C. 119 to Korean Patent Application No. 10-2021-0045172, filed on Apr. 7, 2021, in the Korean Intellectual Property Office, the disclosure of which is herein incorporated by reference in its entirety.

TECHNICAL FIELD

Various embodiments disclosed herein relate to a wearable electronic device including an antenna.

BACKGROUND

Wearable electronic devices can include, among other things, smart watches, glasses. A wearable electronic device can include an internal antenna for wireless communication. For example, a smart watch may use a metal frame forming part of a side surface as an antenna radiator.

Wearable electronic devices typically have a limited size. The limited size limits the covered frequency bands. Thus, a wearable electronic device can include an antenna that supports 2.4 GHz-band Wi-Fi or Bluetooth without support for a cellular network.

Considering the characteristics of a wearable electronic device, antenna radiation of the wearable electronic device may be influenced by the human body. The influence of the human body may vary depending on the frequency band. Therefore, if power is fed to a point of a metal frame used as an antenna radiator, regardless of the frequency band, to conduct communication in a low-frequency band, an mid-frequency band, and a high-frequency band, the antenna radiation efficiency may be degraded. For example, if power is fed to a point of the metal frame relatively close to the human body, the influence of the human body may degrade the antenna radiation efficiency in the mid-frequency band and high-frequency band. If power is fed to a point of the metal frame relatively far from the human body, the failure to use the human body as ground of the antenna may degrade the antenna radiation efficiency in the low-frequency band.

According to various embodiments disclosed herein, power may be fed to a first point of a metal frame having a first height in the case of a low-frequency band, and power may be fed to a second point of the metal frame having a second height, instead of the first height, in the case of mid-frequency and high-frequency bands, such that each frequency band has a different feeding point.

SUMMARY

A wearable electronic device according to an embodiment may include a metal frame forming at least a portion of a side surface of the wearable electronic device, a display mounted on the metal frame, a rear cover forming a rear surface of the wearable electronic device, a printed circuit board (PCB) disposed in a space formed by the rear cover and the metal frame, and a wireless communication circuit disposed on the PCB, wherein the wireless communication circuit feeds power to a first point of the metal frame, which having a first height from the rear cover, to receive a signal in a first frequency band, and feeds power to a second point of the metal frame, which has a second height from the rear cover that is higher than the first height to receive a signal in a second frequency band higher than the first frequency band.

A wearable electronic device according to an embodiment may include a metal frame forming at least a portion of a side surface of the wearable electronic device, a display mounted on the metal frame, a rear cover forming a rear surface of the wearable electronic device, a printed circuit board (PCB), a wireless communication circuit disposed on the PCB, and a conductive structure, wherein the conductive structure is disposed between the PCB and the rear cover and electrically connected to the wireless communication circuit, and the wireless communication circuit feeds power to a first point of the metal frame, having a first height from the rear cover, through the conductive structure so as to receive a signal in a first frequency band, and feeds power to a second point of the metal frame, having a second height from the rear cover higher than the first height, to receive a signal in a second frequency band higher than the first frequency band.

DETAILED DESCRIPTION

According to certain embodiments disclosed herein, an electronic device may feed power to a first point of a metal housing relatively closer to a rear cover than a display such that the ground of a human body can be utilized as the ground of an antenna in a first frequency band.

In addition, according to certain embodiments, an electronic device may feed power to a second housing of the metal housing relatively close to the display than the rear cover such that degradation of the antenna radiation efficiency due to the influence of the human body in a second frequency band can be reduced or prevented.

Various other advantageous effects identified explicitly or implicitly through the disclosure may be provided.

Hereinafter, certain embodiments of the disclosure will be described with reference to the accompanying drawings. However, this is not intended to limit the disclosure to specific embodiments, and it should be understood that various modifications, equivalents, or alternatives of the embodiments of the disclosure are included.

Figure 1:
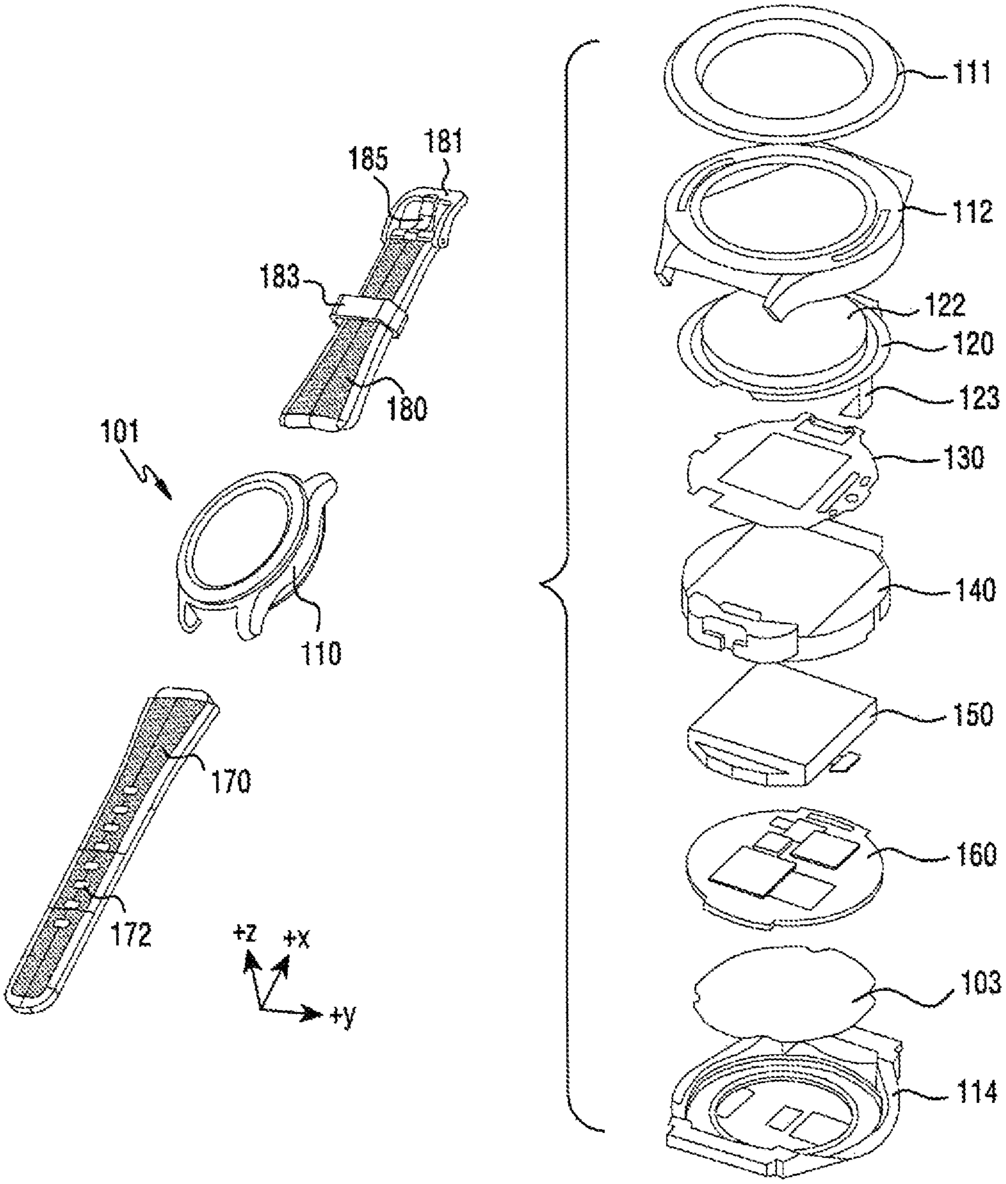
FIG. 1 is an exploded perspective view illustrating an electronic device according to an embodiment.

FIG. 1 is an exploded perspective view illustrating an electronic device according to an embodiment. The electronic device includes a metal frame 112 that may be used as a radiator for an antenna structure to transmit and receive radio frequency (RF) signals.

Referring to FIG. 1, the electronic device 101 may include a housing 110 and a binding member 170 and 180 connected to the housing 110 and configured to detachably bind the electronic device 101 to a body portion (for example, a wrist, an ankle, and the like) of a user. The electronic device 101 can include a wearable electronic device 101. Although a smartwatch 101 is depicted, it shall be understood that wearable electronic devices 101 can include, among other things, glasses and an ankle bracelet, to name a few.

According to an embodiment, the housing 110 may include a wheel key 111, a metal frame 112, a display 120, a conductive support member 130, a bracket 140, a battery 150, a printed circuit board 160, a rear surface cover 114, and a sealing member 103.

According to an embodiment, the wheel key 111 may be disposed on the front surface of the housing 110 and rotate in at least one direction. The wheel key 111 may have a shape corresponding to the display 120. The wheel key 111 may be a key input device configured to receive a user input through a rotation operation. In another embodiment, the wheel key 111 may be implemented into a different form such as a soft key, or may be omitted. According to an embodiment, the metal frame 112 may be disposed under the wheel key 111 to be coupled to the wheel key 111. The metal frame 112 may form at least a portion of a side surface of the housing 110. The metal frame 112 may be formed of a conductive material. For example, the metal frame 112 may be formed of a metal material such as aluminum. According to an embodiment, an antenna structure may be formed to transmit or receive a radio frequency (RF) signal, by at least a portion of the metal frame 112.

According to an embodiment, the display 120 may be disposed under the metal frame 112. The display 120 may be mounted in a space formed by the metal frame 112 and exposed to the outside through an opening formed through the metal frame 112. According to an embodiment, the shape of the display 120 may correspond to the shape of the opening formed through the metal frame 112. The display 120 may have various shapes such as a circle, an oval, or a polygon.

According to an embodiment, the display 120 may be electrically connected to the printed circuit board 160 through a flexible circuit board 123. According to an embodiment, one end of the flexible circuit board 123 may be electrically connected to the display 120, and the other end of the flexible circuit board 123 may be electrically connected to the printed circuit board 160.

According to an embodiment, the display 120 may include a window (or a transparent plate) 122. The window 122 may be formed of glass, plastic, or a polymer. Light output from the display 120 may pass through the window 122 to be emitted to the outside.

According to an embodiment, the display 120 may be combined to or disposed adjacent to a touch sensing circuit, a pressure sensor configured to measure strength (pressure) of a touch, and/or a fingerprint sensor which are not illustrated in the drawings. Data or a signal obtained from the touch sensing circuit, the pressure sensor, and the fingerprint sensor may be provided to a processor disposed on the printed circuit board 160 through the flexible circuit board 123.

According to an embodiment, the bracket 140 may be disposed inside the electronic device 101 to be connected to the metal frame 112 or integrally formed with the metal frame 112. The bracket 140 may be formed of, for example, a metal material and/or a non-metal (for example, a polymer) material. The bracket 140 may receive the battery 150 therein. An internal space of the bracket 140 may have a volume larger than that of the battery 150 in consideration of swelling of the battery 150. According to another embodiment, an antenna structure may be formed of a part or a combination of the bracket 140 and/or the metal frame 112.

According to an embodiment, the battery 150 may supply power to at least one component of the electronic device 101. The battery 150 may include a non-rechargeable primary battery, a rechargeable secondary battery, or a fuel cell. The battery 150 may be disposed in a space formed by the bracket 140. According to an embodiment, the battery 150 may be disposed in and integrated into the electronic device 101, and may be disposed in the electronic device 101 in an attachable and detachable manner.

According to an embodiment, the conductive support member 130 may be disposed between the display 120 and the bracket 140. The conductive support member 130 may be disposed on one surface of the bracket 140 to support the battery 150 not to deviate to the outside of the bracket 140. The conductive support member 130 may be formed of a metal material such as stainless steel, for example. According to an embodiment, the conductive support member 130 may be a conductive plate having a form of a sheet or a thin film.

According to an embodiment, the printed circuit board 160 may be disposed between the bracket 140 and the rear cover 114. A processor, a memory, and/or an interface may be mounted to the printed circuit board 160.

According to an embodiment, the processor may include, for example, one or more of a central processing device, an application processor, a graphic processing unit (GPU), an application processor sensor processor, or a communication processor. The communication processor may include a wireless communication circuit.

According to an embodiment, the memory may include, for example, a volatile memory or a nonvolatile memory. The memory may store various data (for example, an application and data related to an application) or an instruction used by another component (for example, a processor) of the electronic device 101.

According to an embodiment, the rear cover 114 may be coupled to the metal frame 112 to form a rear surface of the electronic device 101. The rear cover 114 may be formed of a substantially opaque material. The rear cover 114 may be formed by, for example, coated or colored glass, ceramic, polymers, metals (for example, aluminum, stainless steel (STS), or magnesium), or a combination of at least two thereof.

According to an embodiment, the sealing member 103 may be disposed between the metal frame 112 and the rear cover 114. The sealing member 103 may be configured to block moisture and foreign substances from being introduced from the outside to a space surrounded by the metal frame 112 and the rear cover 114.

According to an embodiment, the binding member 170 and 180 may be detachably bound to at least a portion of the housing 110. The binding member 170 and 180 may include one or more of a fixation member 185, a fixation member fastening hole 172, a band guide member 181, and a band fixation ring 183.

The fixation member 185 may be configured to fix the binding member 170 and 180 and the housing 110 to a body portion (for example, a wrist and an ankle) of a user. The fixation member fastening hole 172 may fix the binding member 170 and 180 and the housing 110 to a body portion of a user by counteracting with the fixation member 185. The band guide member 181 is configured to limit the movement range of the fixation member 185 when the fixation member 185 is fastened to the fixation member fastening hole 172 so that the binding member 170 and 180 is closely bound to a body portion of a user. The band fixation ring 183 may limit the movement range of the binding member 170 and 180 in a state in which the fixation member 185 is fastened to the fixation member fastening hole 172.

According to an embodiment, the binding member 170 or 180 may be formed of various materials and in various shapes. The binding member may be formed to be integrally and to a plurality of unit links to be movable with each other by using a woven fabric, leather, rubber, urethane, metal, ceramic, or a combination of at least two of the materials.

The electronic device 101 according to an embodiment may include an audio module, a sensor module, a haptic module, and at least one antenna which are not illustrated in the drawings.

According to an embodiment, the at least one antenna may include, for example, a near field communication (NFC) antenna, a wireless charge antenna, and/or a magnetic secure transmission (MST) antenna. The at least one antenna, for example, may perform a near field communication with an external electronic device, wirelessly transmit and receive power required for charging, or transmit a magnetism-based signal including a near field communication signal or payment data. According to an embodiment, an antenna structure may be formed of a part or a combination of the metal frame 112 and/or the rear cover 114.

However, antenna radiation of the electronic device 101 may be influenced by the human body. The influence of the human body may vary depending on the frequency band. For example, if power is fed to metal frame 112 at a point that is close to the human body (when the electronic device 101 is normally used), the influence of the human body may degrade the antenna radiation efficiency in the mid-frequency band and high-frequency band. If power is fed to a point that is away from the human body (when the electronic device 101 is normally used), the failure to use the human body as ground may degrade the antenna radiation efficiency in the low-frequency band.

According to certain embodiments disclosed herein, an electronic device 101 may feed power to a first point of a metal housing that is relatively closer to a rear cover than a display such that the human body can be utilized as the ground of an antenna in a first frequency band. Additionally, the electronic device 101 may feed power to a second housing of the metal housing relatively close to the display than the rear cover such that degradation of the antenna radiation efficiency due to the influence of the human body in a second frequency band can be reduced or prevented.

Figure 2:
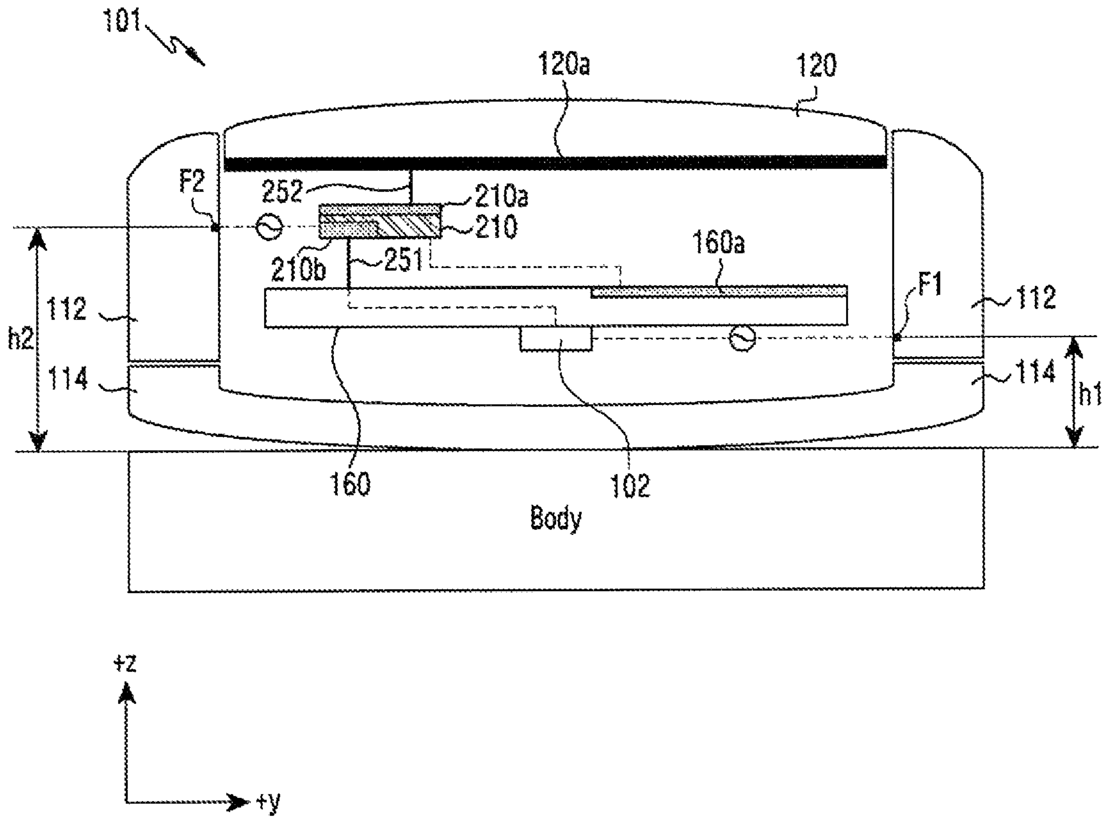
FIG. 2 is a diagram illustrating an electronic device including a first conductive structure according to an embodiment.

FIG. 2 is a diagram illustrating an electronic device including a first conductive structure according to an embodiment. A wireless communication circuit 102 feeds power to a first feeding point F1 at height H1 for transmitting and receiving RF signals in a first frequency band. The wireless communication circuit 102 feeds power to a second feeding point F2 at height H2 for transmitting and receiving RF signals in a first frequency band. The wireless communication circuit 102 is mounted on a printed circuit board (PCB) 160. The PCB 160 includes a first ground 160*a*, and is connected via a first conductive connection member 251 to a first conductive structure 210. The first conductive structure 210 includes a second ground 210*a*.

A rear cover 114 that makes contact with the user's body (the wrist). Accordingly, an antenna associated with a first feeding point F1 may use the user's body as ground, because the feeding point F1 is closer to the rear cover 114. This can increase radiation efficiency in a lower frequency band through extension of an antenna ground. Since the user's body blocks signals in the higher frequency. Accordingly, the feeding point F2 is closer to the display.

Referring to FIG. 2, the printed circuit board 160 according to an embodiment may include a first ground 160*a*. The first ground 160*a* may be electrically connected to the metal frame 112 and used as a ground of an antenna as described below with reference to FIG. 3A.

The electronic device 101 according to an embodiment may include a first conductive structure 210. The first conductive structure 210 may be disposed between the printed circuit board 160 and the display 120. For example, the first conductive structure 210 may correspond to a printed circuit board, a flexible circuit board, or a wireless charging coil. In an embodiment, the first conductive structure 210 may be electrically connected to the printed circuit board 160 through a first conductive connection member 251. For example, the first conductive connection member 251 may correspond to a coaxial cable, a C-clip, a metal wire, or a pogo-pin. In an embodiment, the first conductive structure 210 may include a second ground 210*a*. The second ground 210*a* may be electrically connected to the metal frame 112 at one point to be used as a ground of an antenna as described below with reference to FIG. 3B. In an embodiment, the second ground 210*a* may be electrically connected to the first ground 160*a*. For example, the second ground 210*a* may be electrically connected to the first ground 160*a* through the first conductive connection member 251. The dotted line indicating the electrical connection relationship described in FIG. 2 between the first ground 160*a* and the second ground 210*a* is illustrated to be distinguished from the first conductive connection member 251. However, the illustration is for convenience of description and the first ground and the second ground may actually be electrically connected through the first conductive connection member 251.

In an embodiment, the first conductive structure 210 may include a first feeding unit 210*b* for feeding power. In an embodiment, the printed circuit board 160 may be electrically connected to the display 120. For example, the first feeding unit 210*b* may be electrically connected to the second ground 210*a* and a third ground 120*a* of the display 120, and as a result, the printed circuit board 160 may be electrically connected to the display 120 through the first feeding unit 210*b*, the second ground 210*a*, and the third ground 120*a*. In an embodiment, as the printed circuit board 160 is electrically connected to the display 120, an electronic component (for example, a processor and the wireless communication circuit 102) disposed on the printed circuit board 160 may be connected to the display 120.

In an embodiment, the display 120 may include a metal layer corresponding to the third ground 120*a*. For example, the metal layer may comprise a copper (Cu) shield layer. In an embodiment, the third ground 120*a* of the display 120 and the second ground 210*a* of the first conductive structure 210 may be electrically connected through a second conductive connection member 252. The second conductive connection member 252 may comprise, for example, a coaxial cable, a C-clip, a metal wire, or a pogo-pin. In an embodiment, the electronic device 101 may secure a wide antenna ground through the connection between the second ground 210*a* and the third ground 120*a*. In addition, the second ground 210*a* may be electrically connected to the first ground 160*a*, and as a result, the first ground 160*a*, the second ground 210*a*, and the third ground 120*a* may be electrically connected.

According to an embodiment, the electronic device 101 may include a wireless communication circuit 102 disposed on the printed circuit board 160. The wireless communication circuit 102 can receive data for wireless transmission from, and provide data received from wireless communication to, various applications that are executed by at least one processor. In an embodiment, the wireless communication circuit 102 may feed power to the first feeding point F1 of the metal frame 112 so as to transmit and/or receive an RF signal in the first frequency band. In an embodiment, the first feeding point F1 may be referred to as a point relatively closer to the display 120 than the rear cover 114, and the first feeding point F1 may have a first height h1 from the rear cover 114. In an embodiment, as the wireless communication circuit 102 feeds power to the first feeding point F1 relatively closer to the rear cover 114, the electronic device 101 may increase radiation efficiency of an antenna in the first frequency band.

For example, a body portion (for example, a wrist) on which the electronic device 101 is normally worn during normal usage may correspond to or be used as an electrical ground. Considering the characteristics of the first frequency band, the electronic device 101 may need to secure a wide ground when transmitting and/or receiving an RF signal in the first frequency band. When the electronic device 101 is worn, at least a portion of the rear cover 114 may come into contact with a body part (for example, a wrist). As the wireless communication circuit 102 feeds power to the first feeding point F1 closer to the rear cover 114, the electronic device 101 may use a ground of the body part that contacts the rear cover 114 as an antenna ground. Accordingly, the electronic device 101 may increase radiation efficiency in the first frequency band through extension of an antenna ground. By way of example, during extension of an antenna ground, the electronic device 101 may prevent an induced current that may be caused by coupling between an antenna radiation body (for example, the metal frame 112) and conductive components in the electronic device 101.

According to an embodiment, the wireless communication circuit 102 may be electrically connected to the first conductive structure 210 through a first conductive connection member 251. The wireless communication circuit 102 may feed power to the second feeding point F2 of the metal frame 112 through the first feeding unit 210*b* of the first conductive structure 210. Accordingly, the wireless communication circuit 102 can transmit and/or receive an RF signal in the second frequency band. The second frequency band can be higher than the first frequency band. In an embodiment, the second feeding point F2 may be referred to as a point relatively closer to the display 120 than the rear cover 114, and the second feeding point F2 may have a second height h2 larger than the first height h1 from the rear cover 114.

In an embodiment, as the wireless communication circuit 102 feeds power to the second feeding point F2 closer to the display 120, the electronic device 101 may reduce or prevent deterioration of radiation efficiency in the second frequency band due to the body. For example, when the electronic device 101 is worn, the body may block the RF signal in the second frequency band transmitted and/or received through the wireless communication circuit 102. Considering the characteristics of the second frequency band, as a feeding point with respect to an antenna radiator (for example, the metal frame 112) is disposed away from the body, the effect of the body may be reduced or minimized. Therefore, as the wireless communication circuit 102 feeds power to the second feeding point F2 closer to the display 120, the electronic device 101 may reduce or minimize effect of the body so as to reduce or prevent deterioration of radiation efficiency.

Figure 3A:
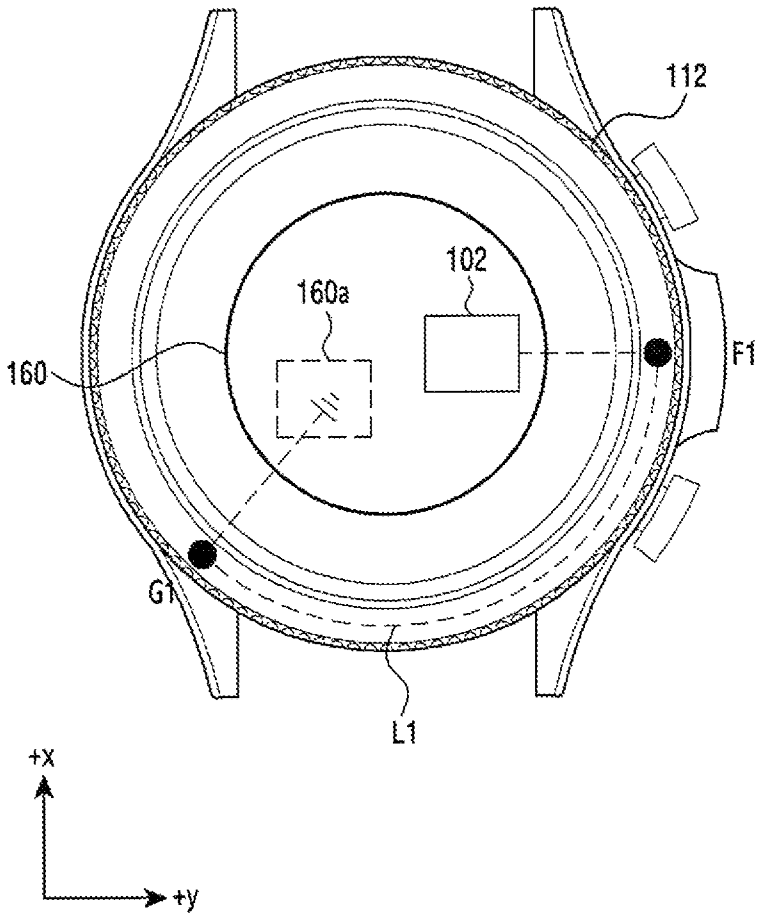
FIG. 3A is a diagram illustrating an electrical path for transmitting or receiving an RF signal in a first frequency band according to an embodiment.

FIG. 3A is a diagram illustrating an electrical path for transmitting or receiving an RF signal in a first frequency band according to an embodiment. The wireless communication circuit 102 forms a path L1 from first feeding point F1 to first ground point G1 to the first ground 160*a* of the printed circuit board 160.

Referring to FIG. 3A, the wireless communication circuit 102 according to an embodiment may feed power to the first feeding point F1 of the metal frame 112, and the first ground 160*a* of the printed circuit board 160 may be electrically connected to the metal frame 112 at a first ground point G1. In an embodiment, the wireless communication circuit 102 may transmit and/or receive an RF signal in the first frequency band based on a first electrical path L1. However, the electrical path L1 is merely one example, and when the wireless communication circuit 102 actually transmits and/or receives an RF signal in a low band, the first ground point G1 may be further away from the first feeding point F1 than that is illustrated in FIG. 3A.

In addition, the feeding point and the ground point illustrated in FIG. 3A are merely an example, and the metal frame 112 may include various feeding points and ground points for transmitting and/or receiving an RF signal in the first frequency band. Accordingly, the wireless communication circuit 102 may transmit and/or receive an RF signal in the first frequency band based on various electrical paths in addition to the first electrical path L1.

According to certain embodiments, the electronic device 101 may include a lumped element electrically connected to the metal frame 112, and the wireless communication circuit 102 may transmit and/or receive an RF signal in a third frequency band based on an electrical path including the metal frame 112 and the lumped element.

Figure 3B:
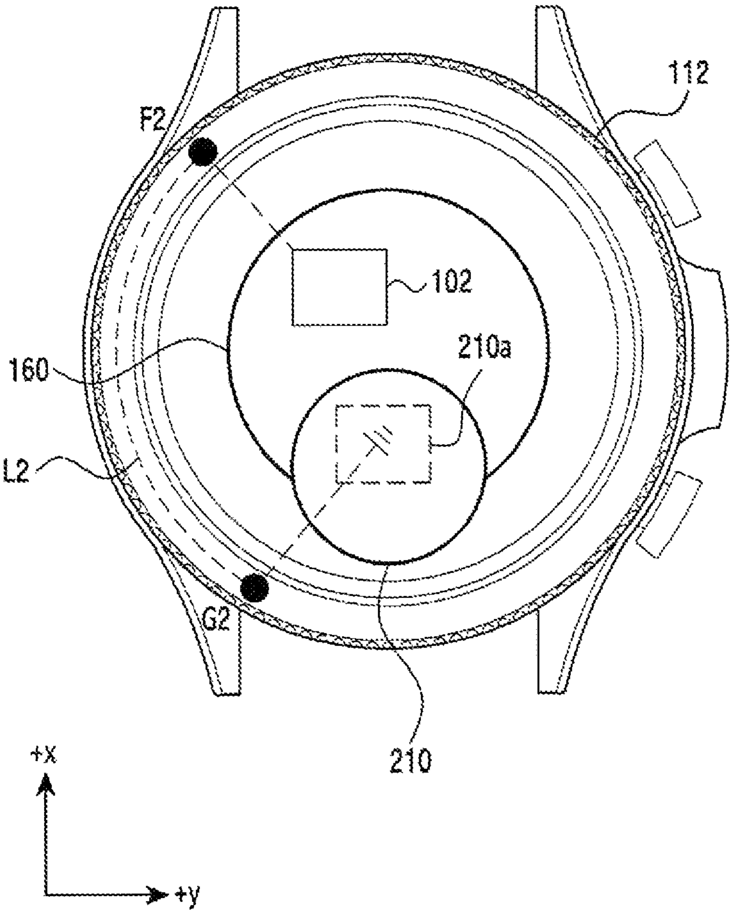
FIG. 3B is a diagram illustrating an electrical path for transmitting or receiving an RF signal in a second frequency band according to an embodiment.

FIG. 3B is a diagram illustrating an electrical path for transmitting or receiving an RF signal in a second frequency band according to an embodiment. The wireless communication circuit 102 forms a path L2 from second feeding point F2 to second ground point G2 to second ground 210*a*.

Referring to FIG. 3B, the wireless communication circuit 102 according to an embodiment may feed power to the second feeding point F2 of the metal frame 112, and the second ground 210*a* of the first conductive structure 210 may be electrically connected to the metal frame 112 at a second ground point G2. In an embodiment, the wireless communication circuit 102 may transmit and/or receive an RF signal in the second frequency band based on a second electrical path L2.

However, the feeding point and the ground point illustrated in FIG. 3B are merely an example, and the metal frame 112 may include various feeding points and ground points for transmitting and/or receiving an RF signal in the second frequency band. Accordingly, the wireless communication circuit 102 may transmit and/or receive an RF signal in the second frequency band based on various electrical paths in addition to the second electrical path L2.

Figure 3C:
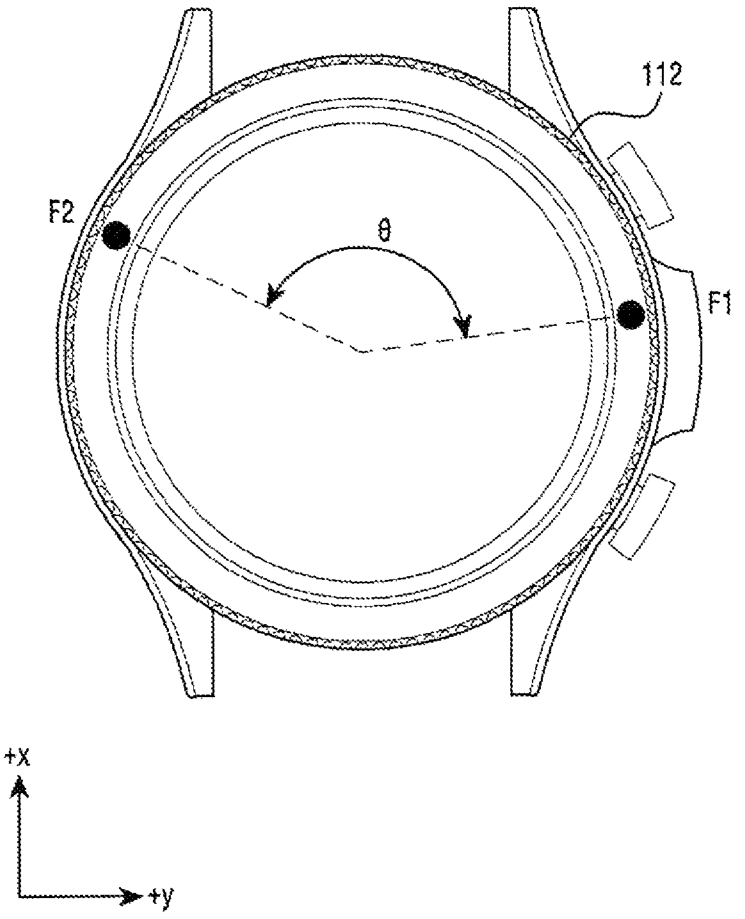
FIG. 3C is a diagram illustrating a method for transmitting or receiving an RF signal by using a first feed point and a second feed point according to an embodiment.

FIG. 3C is a diagram illustrating a method for transmitting or receiving an RF signal by using a first feed point and a second feed point according to an embodiment.

Referring to FIG. 3C, the electronic device 101 according to an embodiment may include a switch circuit (not shown) disposed on the printed circuit board 160. The wireless communication circuit 102 may be electrically connected to the switch circuit and the wireless communication circuit 102 may control the switch circuit to selectively feed power to the first feeding point F1 or the second feeding point F2 of the metal frame 112.

In an embodiment, the wireless communication circuit 102 may transmit and/or receive an RF signal by using a feeding point not being fed as an antenna ground. For example, the wireless communication circuit 102 may control the switch circuit to feed power to the second feeding point F2 and not to feed power to the first feeding point F1. In this case, the first feeding unit (for example the first feeding unit 210*b* in FIG. 2), electrically connected to the first feeding point F1, may correspond to a ground. In other words, when the wireless communication circuit 102 does not feed power to the first feeding unit 210*b*, the first feeding unit 210*b* may operate as a ground. Accordingly, in an embodiment, the first feeding point F1 may correspond to a ground point connected to a ground of an antenna. In an embodiment, the wireless communication circuit 102 may transmit and/or receive an RF signal in a predetermined frequency band based on an electrical path from the first feeding point F1 to the second feeding point F2.

In an embodiment, the predetermined frequency band may correspond to an angle between the first feeding point F1 and the second feeding point F2. For example, when the angle between the first feeding point F1 and the second feeding point F2 increases, the center frequency of the predetermined frequency may move to a low band. For another example, when the angle between the first feeding point F1 and the second feeding point F2 decreases, the center frequency of the predetermined frequency may move to a high frequency band. However, the corresponding relationship between the angle between the first feeding point F1 and the second feeding point F2 and the frequency band in which the wireless communication circuit 102 performs communication is merely an example, and may be changed according to the lumped element and/or a matching circuit.

According to an embodiment, the electronic device may utilize the angle between the first feeding point F1 and the second feeding point F2 to increase isolation of an antenna. For example, the wireless communication circuit 102 may feed power to the metal frame 112 so that the angle θ between the first feeding point F1 and the second feeding point F2 becomes a predetermined angle (for example, 30° or more. In an embodiment, even when the wireless communication circuit 102 feeds power to the first feeding point F1 and the second feeding point F2 of the metal frame 112 through the switch circuit, the first feeding point F1 and the second feeding point F2 make the predetermined angle (for example, 30° or more, and thus the electronic device 101 may prevent interference that may be caused by double feeding to the metal frame 112.

Figure 4:
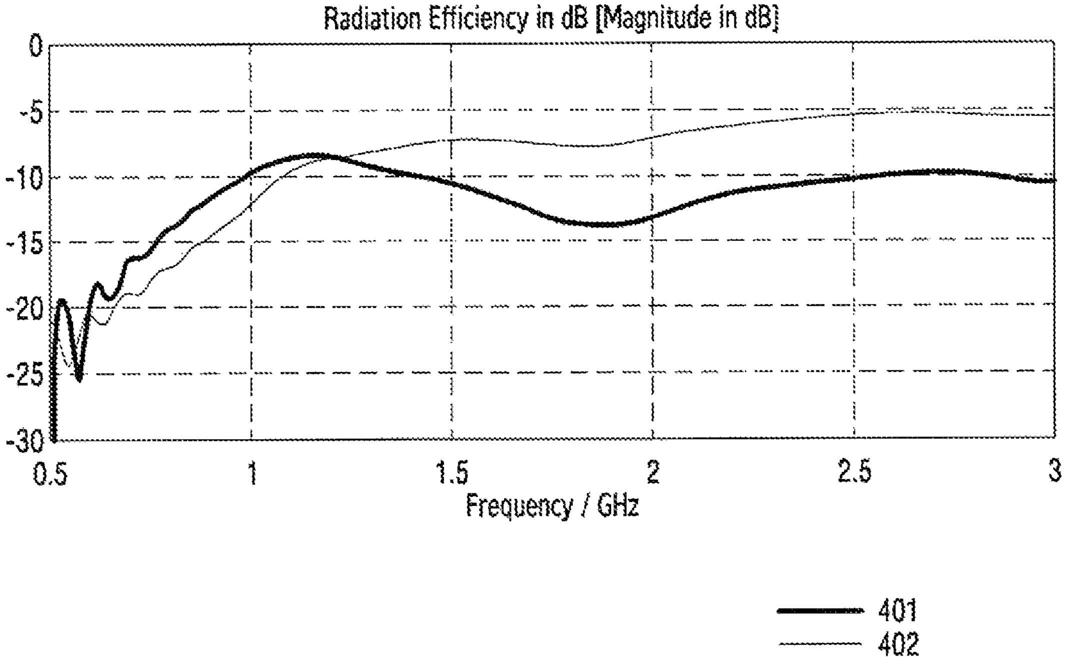
FIG. 4 is a graph depicting radiation efficiency of an antenna when power is fed to a metal frame at a first point and a second point.

FIG. 4 is a graph depicting radiation efficiency of an antenna when power is fed to a metal frame at a first point and a second point.

Referring to FIG. 4, the first graph 401 according to an embodiment is a graph depicting radiation efficiency of an antenna including the metal frame 112 when the wireless communication circuit 102 feeds power to the first feeding point F1 of the metal frame 112. The second graph 402 is a graph depicting radiation efficiency of an antenna including the metal frame 112 when the wireless communication circuit 102 feeds power to the second feeding point F2 of the metal frame 112.

According to an embodiment, the first graph 401 shows high radiation efficiency of an antenna in about 0.6-1.3 GHz frequency band compared to the second graph 402. In an embodiment, when the wireless communication circuit 102 feeds power to the first feeding point F1 relatively closer to the body compared to the second feeding point F2, considering the characteristics of the frequency band of 0.6-1.3 GHz, the electronic device 101 may utilize the body as a ground. Therefore, the wireless communication circuit 102 may increase radiation efficiency of an antenna through expansion of a ground by feeding power to the first feeding point F1 in about 0.6-1.3 GHz frequency band.

According to an embodiment, the second graph 402 shows high radiation efficiency in about 1.3-3 GHz frequency band compared to the first graph 401. In an embodiment, when the wireless communication circuit 102 feeds power to the second feeding point F2 relatively further away from the body compared to the first feeding point F1, considering the characteristics of the frequency band of 1.3-3 GHz, the electronic device 101 may reduce or prevent deterioration of radiation efficiency of an antenna due to the effect of the body.

Accordingly, the electronic device 101 may increase radiation efficiency of an antenna by changing a feeding point of the metal frame 112 to utilize the body according to a frequency band of an RF signal, or may reduce or prevent deterioration of radiation efficiency of an antenna by minimizing the effect of the body.

Figure 5:
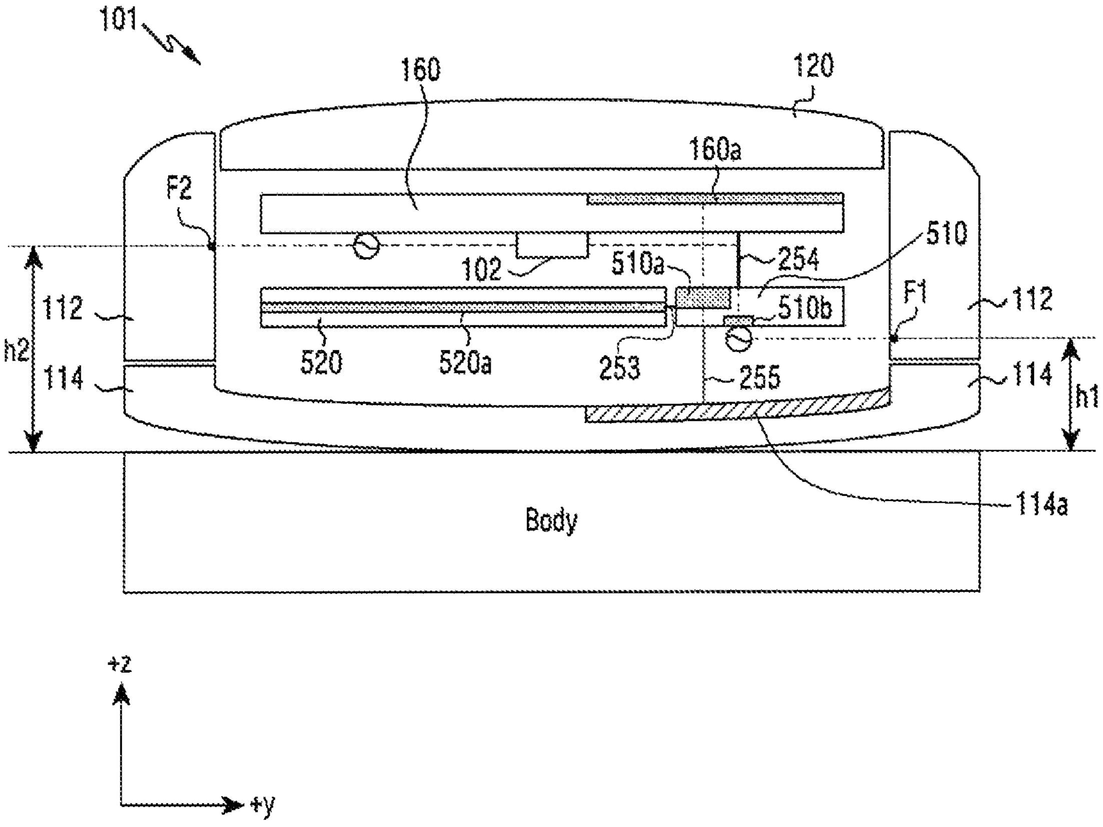
FIG. 5 is a diagram illustrating an electronic device including a second conductive structure and a third conductive structure according to certain embodiments.

FIG. 5 is a diagram illustrating an electronic device including a second conductive structure and a third conductive structure according to certain embodiments.

Referring to FIG. 5, the electronic device 101 according to an embodiment may include a second conductive structure 510 and/or the third conductive structure 520 which are disposed between the printed circuit board 160 and the rear cover 114. The second conductive structure 510 and/or the third conductive structure 520 may comprise, for example, a printed circuit board, a flexible circuit board, or a wireless charging coil.

In an embodiment, the second conductive structure 510 may include a fourth ground 510*a* and the third conductive structure 520 may include a fifth ground 520*a*. The fourth ground 510*a* may be electrically connected to the fifth ground 520*a* through a third conductive connection member 253. In an embodiment, the fourth ground 510*a* may correspond to an antenna ground, and the electronic device 101 may secure a wide antenna ground through the connection between the fourth ground 510*a* and the fifth ground 520*a*. In an embodiment, the first ground 160*a* may be electrically connected to the fourth ground 510*a*. For example, the first ground 160*a* may be electrically connected to the fourth ground 510*a* through the fourth conductive connection member 254. In an embodiment, a dotted line indicating the electrical connection relationship between the first ground 160*a* and the fourth ground 510*a* is illustrated to be distinguished from the fourth conductive connection member 254. However, the illustration is for convenience of description and the first ground 160*a* and the fourth ground 510*a* may actually be electrically connected through the fourth conductive connection member 254. In addition, the fourth ground 510*a* may be electrically connected to the fifth ground 520*a*, and as a result, the first ground 160*a*, the fourth ground 510*a*, and the fifth ground 520*a* may be electrically connected.

According to an embodiment, at least a portion of the rear cover 114 may include a conductive part, and the rear cover 114 may include a sixth ground 114*a*. In this case, the sixth ground 114*a* of the rear cover 114 may be electrically connected to the fourth ground 510*a* through the fifth conductive connection member 255 (for example, a C-clip), and as a result, the sixth ground 114*a* may be electrically connected to the fifth ground 520*a* and the first ground 160*a*.

According to an embodiment, the wireless communication circuit 102 disposed on the printed circuit board 160 may be electrically connected to the second conductive structure 510 through the fourth conductive connection member 254. In an embodiment, the second conductive structure 510 may include the second feeding unit 510*b* for feeding power to the first feeding point F1, and the wireless communication circuit 102 may feed power to the first feeding point F1 of the metal frame 112 through the second feeding unit 510*b* to transmit and/or receive an RF signal in the first frequency band. In an embodiment, the wireless communication circuit 102 may feed power to the second feeding point F2 of the metal frame 112 so as to transmit and/or receive an RF signal in the second frequency band.

Figure 6:
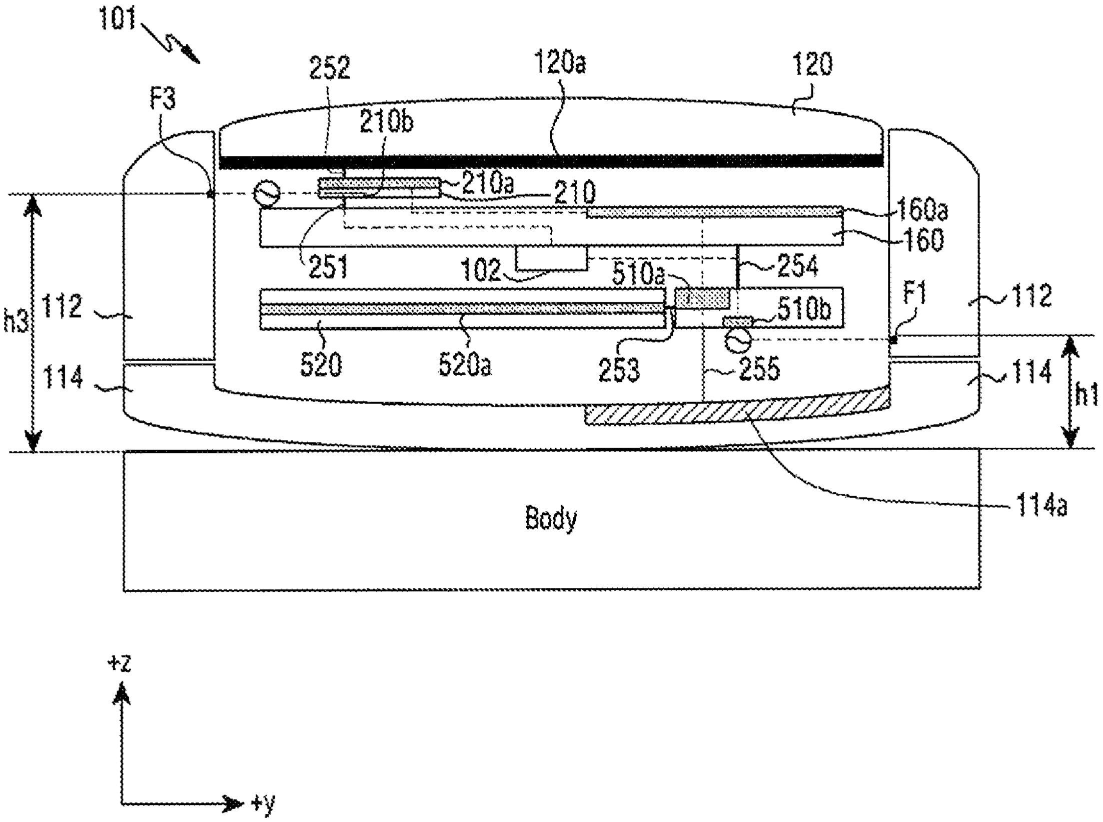
FIG. 6 is a diagram illustrating an electronic device including a first conductive structure, a second conductive structure, and a third conductive structure according to certain embodiments.

FIG. 6 is a diagram illustrating an electronic device including a first conductive structure, a second conductive structure, and a third conductive structure according to certain embodiments.

FIG. 6 is an embodiment of including the first conductive structure 210 of FIG. 2, the second conductive structure 510 of FIG. 5, and the third conductive structure 520 The same numerals may be used for similar elements described above and overlapping description thereof will be omitted.

Referring to FIG. 6, the wireless communication circuit 102 according to an embodiment may be electrically connected to the second conductive structure 510 through the fourth conductive connection member 254. The wireless communication circuit 102 may feed power to the first feeding point F1 through the second feeding unit 510*b* of the second conductive structure 510 so as to transmit and/or receive an RF signal in the first frequency band. In an embodiment, the wireless communication circuit 102 may be electrically connected to the first conductive structure 210 through the first conductive connection member 251. The wireless communication circuit 102 may feed power to the third feeding point F3 of the metal frame 112 through the first feeding unit 210*b* of the first conductive structure 210 so as to transmit and/or receive an RF signal in the second frequency band. In an embodiment, the third feeding point F3 may have a third height h3 higher than the first height h1.

In an embodiment, the first ground 160*a*, the second ground 210*a*, the third ground 120*a*, the fourth ground 510*a*, and the fifth ground 520*a*, and the sixth ground 114*a* may be electrically connected.

Figure 7:
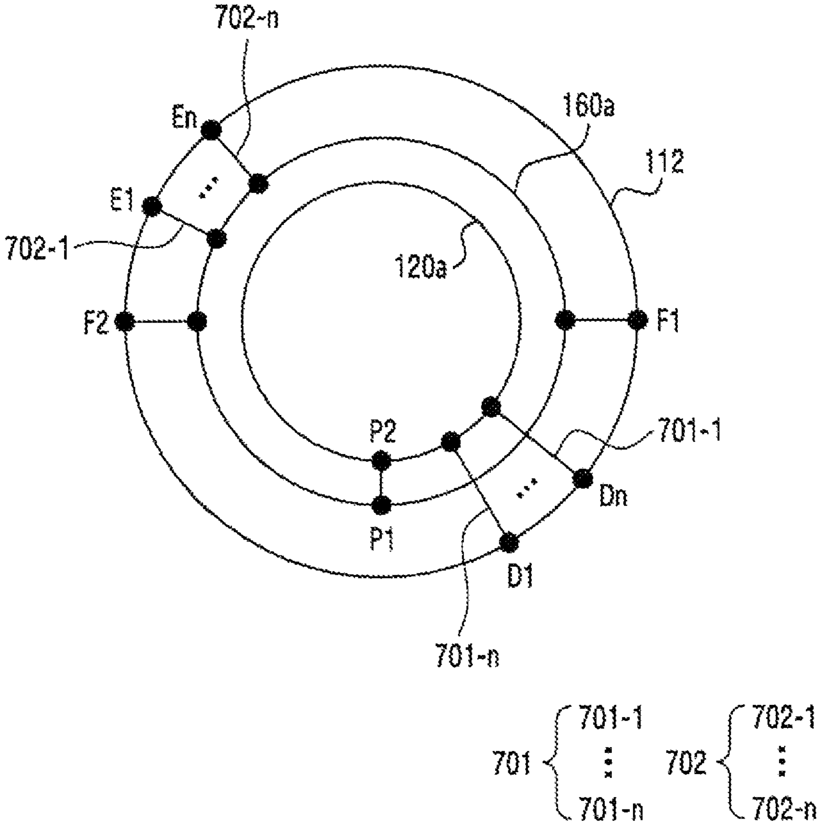
FIG. 7 is a diagram illustrating multi-band implementation of an electronic device through an electrical connection relationship between a metal housing and a ground according to certain embodiments.

FIG. 7 is a diagram illustrating multi-band implementation of an electronic device through an electrical connection relationship between a metal housing and a ground according to certain embodiments.

Referring to FIG. 7, the metal frame 112 according to an embodiment may be electrically connected the third ground 120*a* of the display 120 at multiple points. In an embodiment, the metal frame 112 may be electrically connected to the third ground 120*a* at ground points D1-Dn through conductive connection members 701 corresponding to each ground points D1-Dn. For example, the metal frame 112 may be electrically connected to the third ground 120*a* at a first ground point D1 through a first conductive connection member 701-1.

In an embodiment, the wireless communication circuit 102 may transmit and/or receive an RF signal in multi-frequency bands based on an electrical path from the first feeding point F1 to the ground points D1-Dn. For example, the wireless communication circuit 102 may transmit and/or receive an RF signal in the first frequency band based on an electrical path from the first feeding point F1 to the first ground point D1. For another example, the wireless communication circuit 102 may transmit and/or receive an RF signal in the second frequency band based on an electrical path from the first feeding point F1 to the second ground point D2. For another example, the wireless communication circuit 102 may transmit and/or receive an RF signal in an n-th frequency band based on an electrical path from the first feeding point F1 to an n-th ground point Dn. In an embodiment, the wireless communication circuit 102 may transmit and/or receive an RF signal in multi-frequency bands by using a lumped element in addition to various electrical paths.

According to an embodiment, the metal frame 112 may be electrically connected the first ground 160*a* of the printed circuit board 160 at multiple points. In an embodiment, the metal frame 112 may be electrically connected to the first ground 160*a* at additional ground points E1-En through additional conductive connection members 702 corresponding to each additional ground points E1-En. For example, the metal frame 112 may be electrically connected to the first ground 160*a* at an additional first ground point E1 through a first additional conductive connection member 702-1. In an embodiment, the wireless communication circuit 102 may transmit and/or receive an RF signal in multi-frequency bands based on an electrical path from the second feeding point F2 to the additional ground points E1-En.

According to an embodiment, the first point P1 of the first ground 160*a* may be electrically connected to the second point P2 of the third ground 120*a*, and the electronic device 101 may secure an antenna ground relatively wide compared to the case in which the first ground 160*a* and the second ground 160*b* are not connected.

Figure 8:
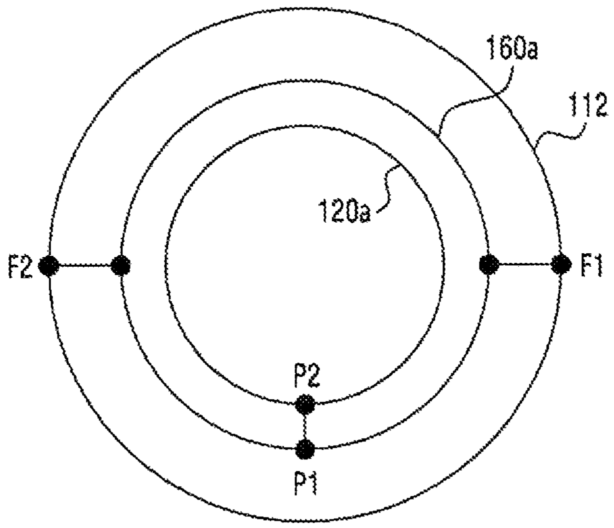
FIG. 8 is a diagram illustrating a case in which a metal housing and a ground are not electrically connected according to another embodiment.

FIG. 8 is a diagram illustrating a case in which a metal housing and a ground are not electrically connected according to another embodiment.

Referring to FIG. 8, compared to the embodiment of FIG. 7, a ground path for the first ground 160*a* and the third ground 120*a* of the metal frame 112 may be not configured in the embodiment of FIG. 8. In an embodiment, even in the case in which a separate ground path is not configured, the wireless communication circuit 102 may feed power to the first feeding point F1 and transmit and/or receive an RF signal in the first frequency band by using a ground of the body. Furthermore, the wireless communication circuit 102 may transmit and/or receive an RF signal in a predetermined frequency band by using a matching circuit electrically connected to the metal frame 112.

Figure 9:
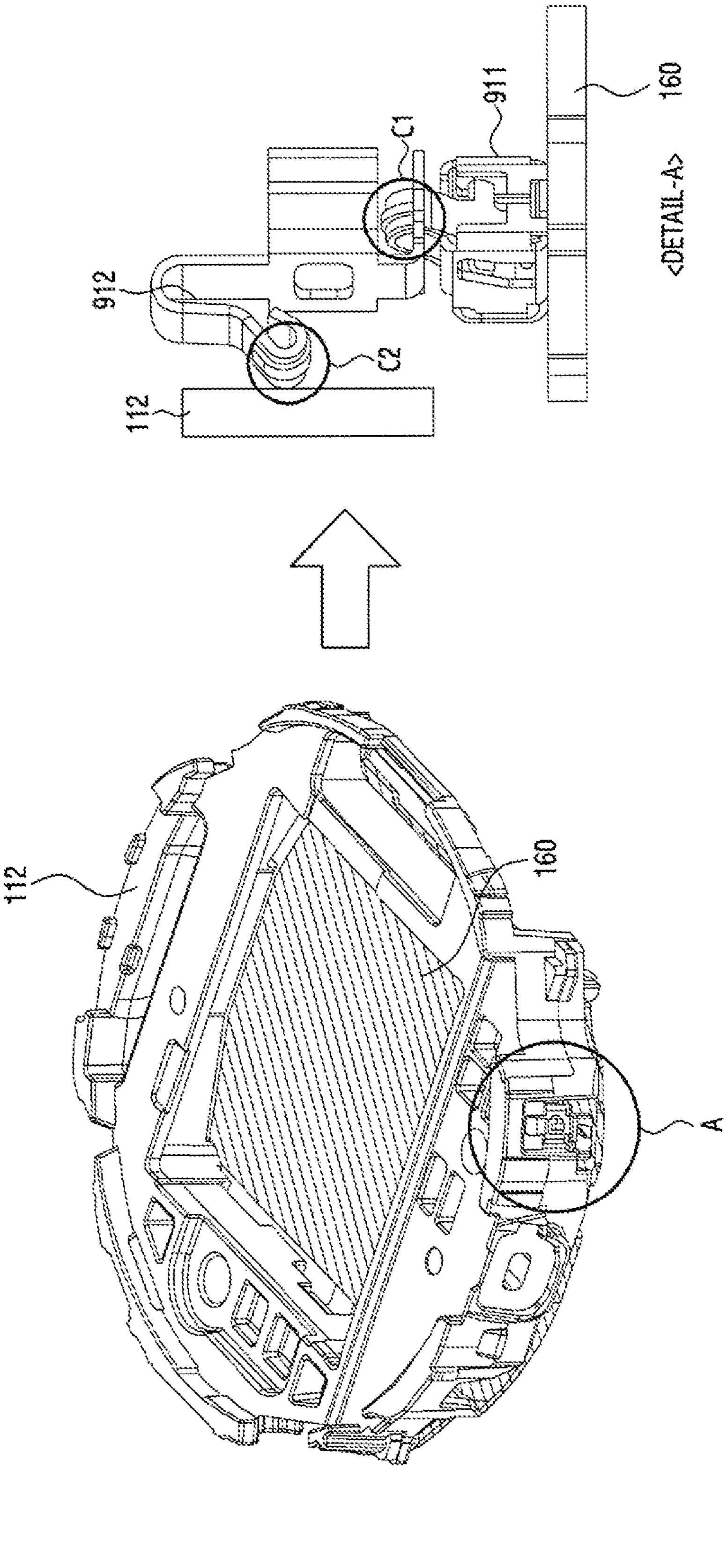
FIG. 9 is a diagram illustrating a specific structure of conductive connection members configured to electrically connect a metal frame to a printed circuit board according to an embodiment.

FIG. 9 is a diagram illustrating a specific structure of conductive connection members configured to electrically connect a metal frame to a printed circuit board according to an embodiment.

Referring to FIG. 9, the electronic device 101 according to an embodiment may include a first connection member 911 (for example, a C-clip) and a second connection member 912 (for example, a side clip) configured to electrically connect the printed circuit board 160 and the metal frame 112. Referring to an enlarge diagram of part A at which the printed circuit board 160 is electrically connected to the metal frame 112, the first connection member 911 may be coupled to the printed circuit board 160, and the second connection member 912 may be coupled to the first connection member 911 at a first contact point C1 so as to be electrically connected. The second connection member 912 may come into contact with the metal frame 112 at a second contact point C2. Accordingly, the printed circuit board 160 and electronic components (for example, the wireless communication circuit 102) disposed on the printed circuit board 160 may be electrically connected to the metal frame 112 through the first connection member 911 and the second connection member 912.

The specific structure of the connection members illustrated in FIG. 9 is merely an example, and the printed circuit board 160 may be electrically connected to the metal frame 112 by only one connection member (for example, the second conductive connection member 912). In addition, the printed circuit board 160 and electronic components (for example, the wireless communication circuit 102) disposed on the printed circuit board 160 may be electrically connected to the metal frame 112 through various methods. For example, the printed circuit board 160 and the metal frame 112 may be electrically connected through a separate contact member (for example, a pogo-pin).

Figure 10:
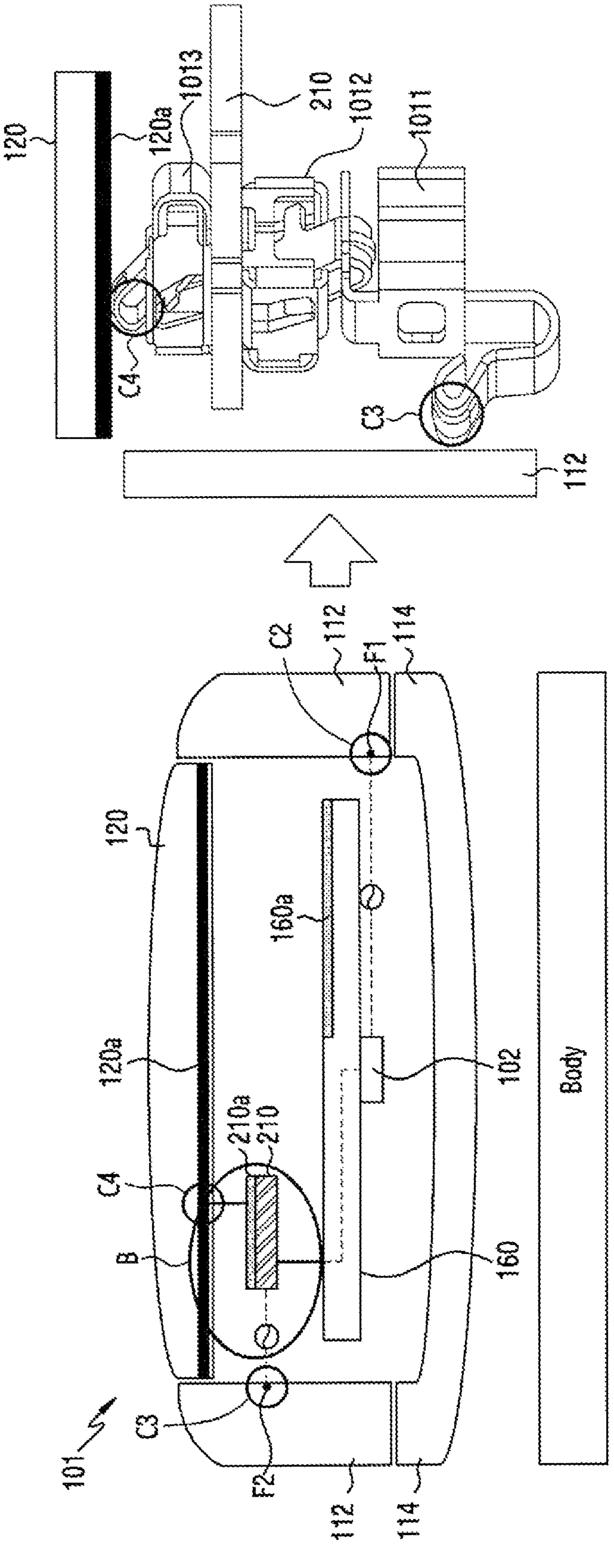
FIG. 10 is a diagram illustrating a specific structure of conductive connection members configured to electrically connect a display to a printed circuit board according to an embodiment.

FIG. 10 is a diagram illustrating a specific structure of conductive connection members configured to electrically connect a display to a printed circuit board according to an embodiment.

Referring to FIG. 10, the electronic device 101 on the left may be substantially identical to the embodiment of the electronic device 101 shown in FIG. 2. Referring to an enlarge diagram of part B at which the first conductive structure 210 is electrically connected to the metal frame 112 and the display 120, the electronic device 101 may include a first connection member 1011 (for example, a side-clip and a second connection member 1012 (for example, a C-clip). In an embodiment, the first connection member 1011 may be coupled to the second connection member 1012 connected to the first conductive structure 210. The first connection member 1011 may come into contact with the metal frame 112 at a third contact point C3 so as to be electrically connected thereto.

The electronic device 101 according to an embodiment may include a third connection member 1013 (for example, a C-clip) configured to electrically connect the first conductive structure 210 and the display 120. The third connection member 1013 may be coupled to one point of the first conductive structure 210 and come into contact with the third ground 120*a* of the display 120 at a fourth contact point C4 so as to be electrically connected thereto. Therefore, the printed circuit board 160 may be electrically connected to the third ground 120*a* of the display 120 through the third connection member 1013.

The specific structure of the connection members illustrated in the embodiment of FIG. 10 is merely an example, and the first conductive structure 210 may be electrically connected to the third ground 120*a* of the display 120 through various connection members.

Figure 11:
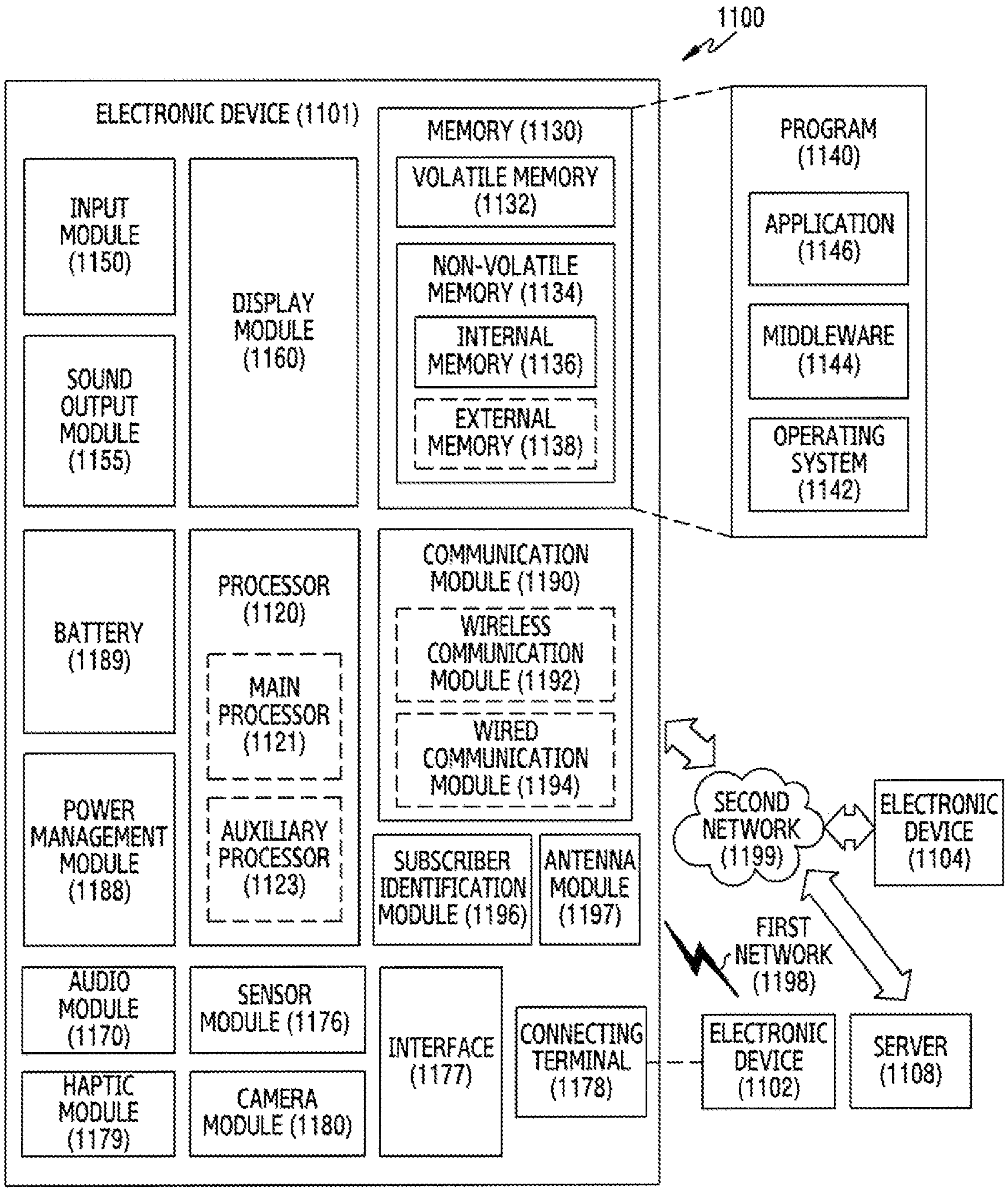
FIG. 11 is a block diagram illustrating an electronic device 101 in a network environment according to certain embodiments.

FIG. 11 is a block diagram illustrating an electronic device 1101 in a network environment 1100 according to certain embodiments. Referring to FIG. 11, the electronic device 1101 in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

"Processor" as used in this document shall be understood to refer to both the singular context and the plural context. The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thererto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

A wearable electronic device according to an embodiment may include a metal frame forming at least a portion of a side surface of the wearable electronic device, a display mounted on the metal frame, a rear cover forming a rear surface of the wearable electronic device, a printed circuit board (PCB) disposed in a space formed by the rear cover and the metal frame, and a wireless communication circuit disposed on the PCB, wherein the wireless communication circuit feeds power to a first point of the metal frame, which having a first height from the rear cover, to receive a signal in a first frequency band, and feeds power to a second point of the metal frame, which has a second height from the rear cover that is higher than the first height to receive a signal in a second frequency band higher than the first frequency band.

According to an embodiment, the first point of the metal frame may be relatively closer to the rear cover than the display, and the second point of the metal frame may be closer to the display than the rear cover.

The wearable electronic device according to an embodiment may further include a conductive structure disposed between the display and the PCB.

According to an embodiment, the wireless communication circuit may be electrically connected to the conductive structure, and may feed power to the second point of the metal frame through the conductive structure and is configured to receive a signal in the second frequency band.

According to an embodiment, the wearable electronic device may include a coaxial cable electrically connecting the PCB and the conductive structure.

According to an embodiment, the conductive structure may include a first ground, the display may include a metal layer corresponding to a second ground, and the first ground of the conductive structure may be electrically connected to the second ground of the display.

The wearable electronic device according to an embodiment may further include a first conductive structure disposed between the rear cover and the PCB.

According to an embodiment, the wearable electronic device may include a coaxial cable electrically connecting the PCB and the first conductive structure.

The wearable electronic device according to an embodiment may further include a second conductive structure disposed between the rear cover and the PCB, the first conductive structure may include a first ground, the second conductive structure may include a second ground, and the first ground of the first conductive structure may be electrically connected to the second ground of the second conductive structure.

The first conductive structure according to an embodiment may include a first ground, at least a portion of the rear cover may include a conductive part corresponding to a second ground, and the first ground of the first conductive structure may be electrically connected to the second ground of the rear cover.

According to an embodiment, the first frequency band may include 0.8-1.3 GHz.

According to an embodiment, the second frequency band may include 1.7-2.5 GHz.

The wearable electronic device according to an embodiment may further include a switch circuit disposed on the PCB, and the switch circuit may be electrically connected to the wireless communication circuit.

According to an embodiment, the wireless communication circuit may control the switch circuit to selectively feed power to the first point of the metal frame or the second point of the metal frame.

The wearable electronic device according to an embodiment may further include a lumped element electrically connected to the metal frame, and the wireless communication circuit may receive a signal in a third frequency band based on an electrical path including the metal frame and the lumped element.

A wearable electronic device according to an embodiment may include a metal frame forming at least a portion of a side surface of the wearable electronic device, a display mounted on the metal frame, a rear cover forming a rear surface of the wearable electronic device, a printed circuit board (PCB), a wireless communication circuit disposed on the PCB, and a conductive structure, wherein the conductive structure is disposed between the PCB and the rear cover and electrically connected to the wireless communication circuit, and the wireless communication circuit feeds power to a first point of the metal frame, having a first height from the rear cover, through the conductive structure so as to receive a signal in a first frequency band, and feeds power to a second point of the metal frame, having a second height from the rear cover higher than the first height, to receive a signal in a second frequency band higher than the first frequency band.

According to an embodiment, the first point of the metal frame may be closer to the rear cover than the display, and the second point of the metal frame may be relatively closer to the display than the rear cover.

According to an embodiment, the wearable electronic device may include a coaxial cable connecting the PCB and the conductive structure.

According to an embodiment, the PCB may include a first ground, the display may include a metal layer corresponding to a second ground, and the first ground of the PCB may be electrically connected to the second ground of the display.

According to an embodiment, the first frequency band may include 0.8-1.3 GHz.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A wearable electronic device comprising:
- a metal frame forming at least a portion of a side face of the wearable electronic device;
- a display mounted on the metal frame;
- a rear cover forming a rear face of the wearable electronic device;
- a printed circuit board (PCB) disposed in a space surrounded by the rear cover and the metal frame;
- a conductive structure disposed between the PCB and the display and electrically connected with the PCB;
- a first conductive member disposed on the conductive structure; and
- a wireless communication circuit disposed on the PCB,
- wherein the wireless communication circuit is configured to:
  - feed power to a first point of the metal frame cover, to receive a first signal of a first frequency band; and
  - feed power to a second point of the metal frame to receive a second signal of a second frequency band higher than the first frequency band via the first conductive member,
- wherein the first point has a first height from the rear cover and the second point has a second height from the rear cover, and
- wherein the second height is higher than the first height.

2. The wearable electronic device of claim 1, wherein the first point of the metal frame is closer to the rear cover than the display, and
- wherein the second point of the metal frame is closer to the display than the rear cover.

3. The wearable electronic device of claim 1, wherein the conductive structure includes a PCB, a flexible PCB (FPCB) or a wireless charging coil.

4. The wearable electronic device of claim 1, wherein the wireless communication circuit is electrically connected to the conductive structure via a second conductive member for connecting the PCB and the conductive structure, and
- wherein the wireless communication circuit is configured to:
  - feeds power to the second point of the metal frame via the second conductive member, the conductive structure, and the first conductive member, and
  - receive the second signal of the second frequency band.

5. The wearable electronic device of claim 4, wherein the second conductive member includes a coaxial cable electrically connecting the PCB and the conductive structure.

6. The wearable electronic device of claim 1, wherein the conductive structure includes a first ground,
- wherein the display includes a metal layer corresponding to a second ground, and
- wherein the first ground of the conductive structure is electrically connected to the second ground of the display.

7. The wearable electronic device of claim 1, further comprising:
- a first conductive structure disposed between the rear cover and the PCB.

8. The wearable electronic device of claim 7, further comprising:
- a third conductive member including a coaxial cable electrically connecting the PCB and the first conductive structure.

9. The wearable electronic device of claim 7, further comprising:
- a second conductive structure disposed between the rear cover and the PCB,
- wherein the first conductive structure comprises a first ground,
- wherein the second conductive structure comprises a second ground, and
- wherein the first ground of the first conductive structure is electrically connected to the second ground of the second conductive structure.

10. The wearable electronic device of claim 7, wherein the first conductive structure includes a first ground, wherein at least a portion of the rear cover includes a second ground, and wherein the first ground of the first conductive structure is electrically connected to the second ground of the rear cover.

11. The wearable electronic device of claim 7, wherein the first conductive structure includes a portion for feeding, and wherein the wireless communication circuit is configured to feed power to the first point via the portion.

12. The wearable electronic device of claim 1, further comprising:

a switch circuit disposed on the PCB, wherein the switch circuit is electrically connected to the wireless communication circuit.

13. The wearable electronic device of claim 12, wherein the wireless communication circuit is configured to controls the switch circuit to selectively feed power to the first point of the metal frame or the second point of the metal frame.

14. The wearable electronic device of claim 1, further comprising:

a lumped element electrically connected to the metal frame, wherein the wireless communication circuit is configured to receives a third signal of a third frequency band based on an electrical path including the metal frame and the lumped element.

15. The wearable electronic device of claim 1, further comprising:

a fourth conductive member disposed on the PCB, wherein the wireless communication circuit is configured to feed power to the first point via the fourth conductive member disposed on the PCB.

16. A wearable electronic device comprising:

a metal frame forming at least a portion of a side face of the wearable electronic device;

a display mounted on the metal frame;

a rear cover forming a rear face of the wearable electronic device;

a first printed circuit board (PCB) disposed in a space surrounded by the rear cover and the metal frame;

a second PCB disposed between the first PCB and the display, and electrically connected with the first PCB;

a third PCB disposed between the first PCB and the rear cover, and electrically connected with the first PCB;

a wireless communication circuit disposed on the first PCB; and a first conductive member disposed on the second PCB, wherein the wireless communication circuit is configured to:

feed power to a first point of the metal frame receive a first signal of a first frequency band via the third PCB, and feed power to a second point of the metal frame to receive a second signal of a second frequency band higher than the first frequency band via the first conductive member disposed on the second PCB, wherein the first point has a first height from the rear cover and the second point has a second height from the rear cover, and wherein the second height is higher than the first height.

17. The wearable electronic device of claim 16, wherein the first point of the metal frame is relatively closer to the rear cover than the display, and wherein the second point of the metal frame is closer to the display than the rear cover.

18. The wearable electronic device of claim 16, further comprising:

a second conductive member including a coaxial cable for connecting the first PCB and the third PCB.

19. The wearable electronic device of claim 16, wherein the first PCB includes a first ground, wherein the display comprises a metal layer corresponding to a second ground, and wherein the first ground of the first PCB is electrically connected to the second ground of the display.

20. The wearable electronic device of claim 16, wherein the first frequency band includes 0.8-1.3 GHZ.

* * * * *